US012286891B1

(12) United States Patent
McManus et al.

(10) Patent No.: US 12,286,891 B1
(45) Date of Patent: Apr. 29, 2025

(54) INNER TURBINE CASE SUSPENSION DEVICE AND METHOD OF ALIGNMENT

(71) Applicant: GE Infrastructure Technology LLC, Greenville, SC (US)

(72) Inventors: Kelly McManus, Greenville, SC (US); Thomas A. Mogle, Simpsonville, SC (US); Christopher David Runkel, Taylors, SC (US); William Ordean, Coldwater, OH (US); Sandra Kolvick, Five Forks, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/772,440

(22) Filed: Jul. 15, 2024

(51) Int. Cl.
*F01D 25/28* (2006.01)
*F01D 25/24* (2006.01)
*F01D 25/26* (2006.01)

(52) U.S. Cl.
CPC ............. *F01D 25/24* (2013.01); *F01D 25/26* (2013.01); *F01D 25/28* (2013.01); *F05D 2220/32* (2013.01); *F05D 2230/72* (2013.01); *F05D 2230/80* (2013.01); *F05D 2240/14* (2013.01)

(58) Field of Classification Search
None
See application file for complete search history.

(56) References Cited

U.S. PATENT DOCUMENTS 7,493,771 B2 2/2009 Lohmueller et al.
9,032,599 B2 5/2015 Spanos
9,394,829 B2 7/2016 Cabeen et al.
9,435,218 B2 9/2016 Casavant et al.
2013/0202417 A1 8/2013 Spanos et al.
2014/0013768 A1 1/2014 Laing et al.
2015/0144761 A1 5/2015 Davi et al.
2017/0167298 A1 6/2017 Kolvick et al.
2017/0248034 A1 8/2017 Dzieciol et al.
2018/0010617 A1 1/2018 Casavant et al.
2020/0141313 A1 5/2020 Cooper et al.
(Continued)

FOREIGN PATENT DOCUMENTS

CN 107131014 A 9/2017
KR 101251461 B1 4/2013
(Continued)

*Primary Examiner* — Courtney D Heinle
*Assistant Examiner* — Danielle M. Christensen
(74) *Attorney, Agent, or Firm* — Eversheds Sutherland (US) LLP

(57) ABSTRACT

This application provides an inner compressor casing suspension device for lifting an inner compressor casing-inner diffuser casing assembly within an outer compressor casing. The inner compressor casing suspension device may include one more forward inner compressor casing suspension devices extending from the outer compressor casing to the inner compressor casing-inner diffuser casing assembly with each of the one or more forward inner compressor casing suspension devices including a C-clamp and a forward lifting device, and one or more aft inner compressor casing suspension devices extending from the outer compressor casing to the inner compressor casing-inner diffuser casing assembly with each of the one or more aft inner compressor casing suspension devices including an aft lifting device.

14 Claims, 6 Drawing Sheets

(56) References Cited

U.S. PATENT DOCUMENTS

| | | | | |
|---|---|---|---|---|
| 2023/0313708 | A1* | 10/2023 | Mote | F01D 25/26 29/464 |
| 2023/0358402 | A1 | 11/2023 | Schott et al. | |
| 2024/0077000 | A1 | 3/2024 | Woszczak et al. | |

FOREIGN PATENT DOCUMENTS

| | | | |
|---|---|---|---|
| KR | 101264435 | B1 | 5/2013 |
| KR | 101364435 | B1 | 2/2014 |
| KR | 20160065599 | A | 6/2016 |

* cited by examiner

INNER TURBINE CASE SUSPENSION DEVICE AND METHOD OF ALIGNMENT

TECHNICAL FIELD

The present application and the resultant patent relate generally to gas turbine engines and more particularly relate to devices and methods for aligning an inner compressor casing and an inner diffuser casing of a double walled compressor in the field.

BACKGROUND

Generally described, a double walled compressor design includes an inner compressor case, an inner diffuser casing assembly that rests inside of a compressor discharge case, and a main compressor case. During the alignment of the inner compressor casing and the inner diffuser casing assembly, a thrust face between the inner and outer casings must be in complete, circumferential contact for proper operation and efficiency. During unit shut down, the aft weight of the inner casing assembly tends to tip down due to gravity such that the thrust face may no longer be in complete circumferential contact and the overall casing assembly may no longer be in alignment.

To assist in the alignment, the inner compressor casing needs to be lifted off the "ears" on the inner compressor casing-inner diffuser casing assembly, which provide support for the casings at a horizontal joint. Once the inner compressor casing is lifted, the assembly can be thrust aft fully against the thrust face. Any gaps in the thrust face can be checked via feeler gauges and sight holes. In the factory, the casings are installed and aligned with the use of overhead cranes and other types of heavy equipment. This alignment process was never expected to be done in the field or with the upper half of the outer compressor casing or the rotor in place.

SUMMARY

This application and the resultant patent provide an inner compressor casing suspension device for lifting an inner compressor casing-inner diffuser casing assembly within an outer compressor casing. The inner compressor casing suspension device may include one or more forward inner compressor casing suspension devices extending from the outer compressor casing to the inner compressor casing-inner diffuser casing assembly with each of the one or more forward inner compressor casing suspension devices including a C-clamp and a forward lifting device, and one or more aft inner compressor casing suspension devices extending from the outer compressor casing to the inner compressor casing-inner diffuser casing assembly with each of the one or more aft inner compressor casing suspension devices including an aft lifting device.

This application and the resultant patent further provide a method of lifting an inner compressor casing-inner diffuser casing assembly within an outer compressor casing. The method includes the steps of attaching one or more forward inner compressor casing suspension devices from the outer compressor casing to a flange of an inner compressor casing of the inner compressor casing-inner diffuser casing assembly via a C-clamp, attaching one or more aft inner compressor casing suspension devices from the outer compressor casing to an inner diffuser casing of the inner compressor casing-inner diffuser casing assembly, and lifting the inner compressor casing-inner diffuser casing assembly via the one or more forward inner compressor casing suspension devices and the one or more aft inner compressor casing suspension devices.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
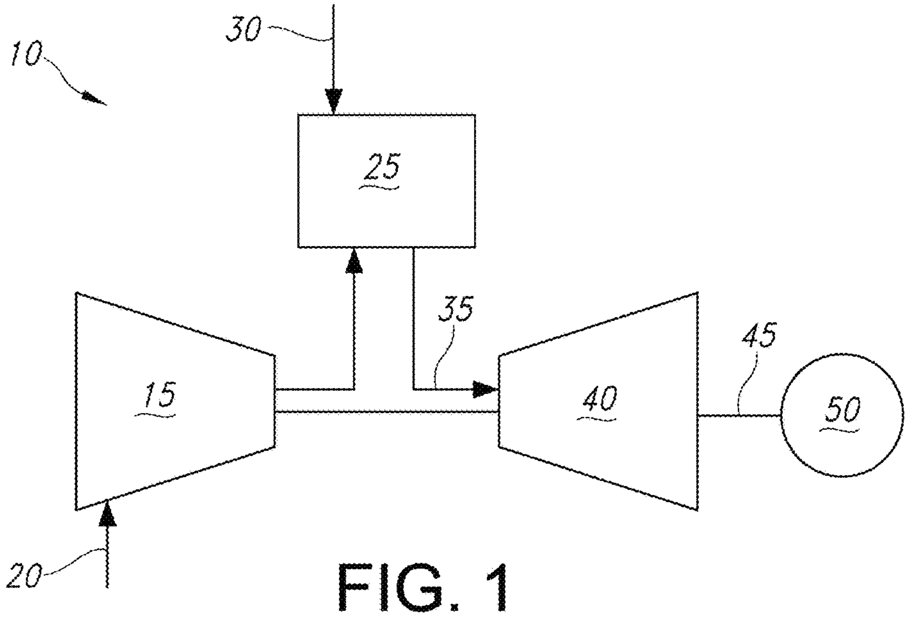
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by GE Vernova, including, but not limited to, those such as a 7- or a 9-series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
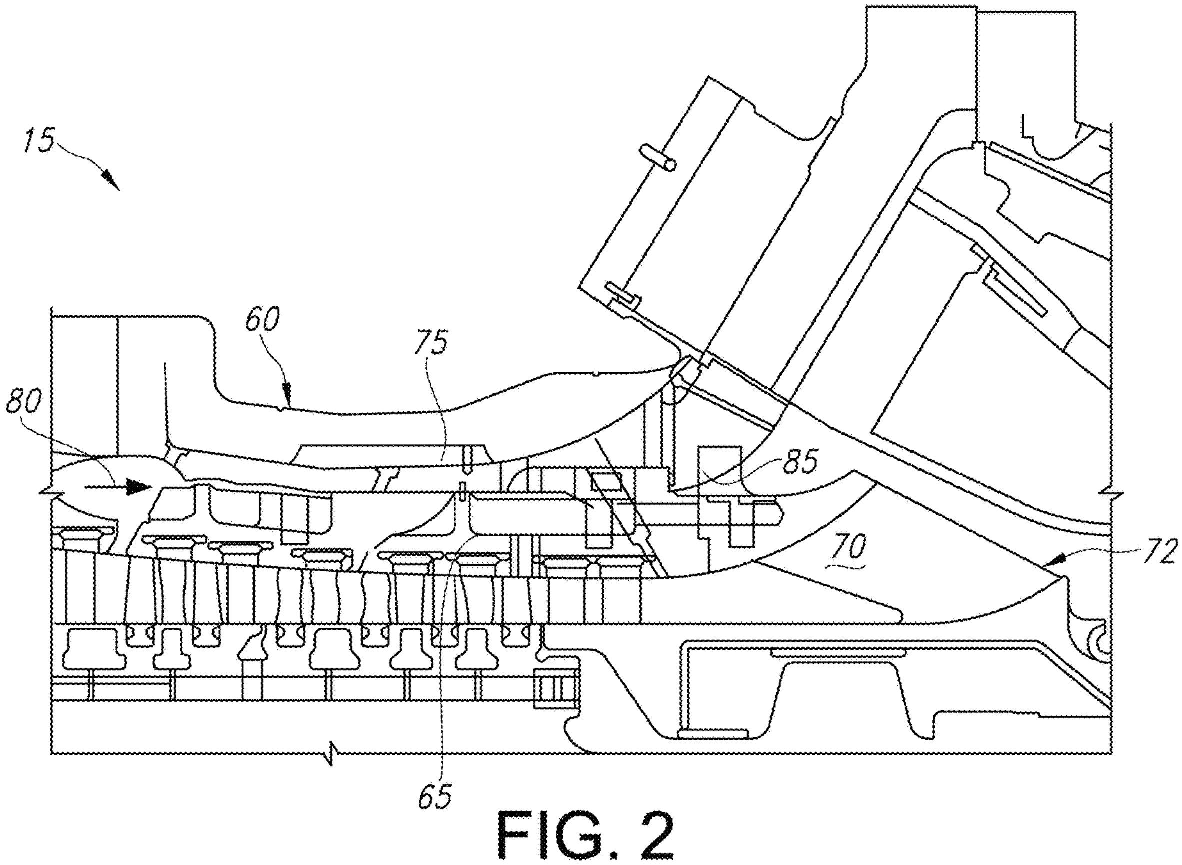
FIG. 2 is a partial sectional view of the compressor of the gas turbine engine of FIG. 1.
Figure 3:
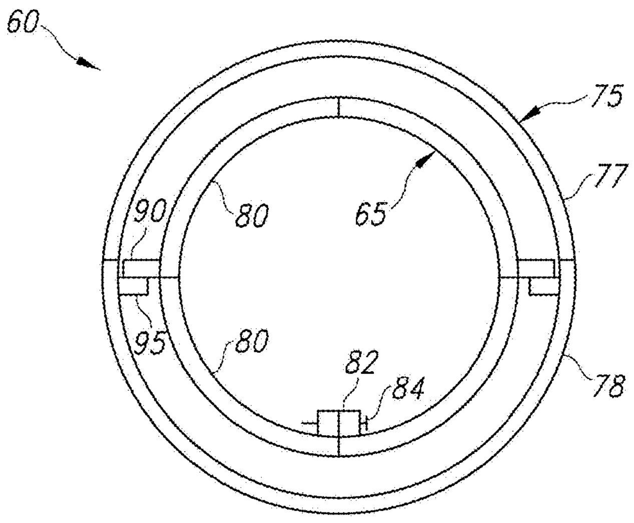
FIG. 3 is a schematic diagram of the positioning of an inner compressor casing and an outer compressor casing.
Figure 4:
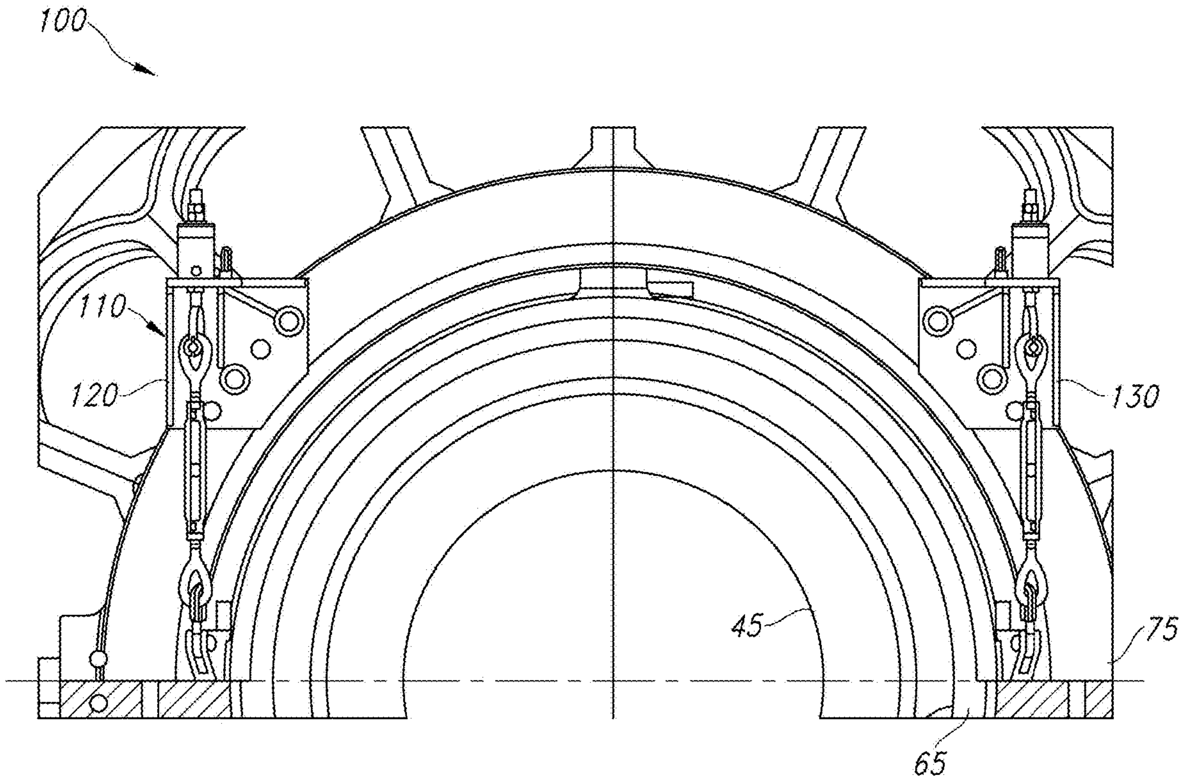
FIG. 4 is a front plan view of a pair of forward inner compressor casing suspension devices of the inner compressor casing suspension device.
Figure 5:
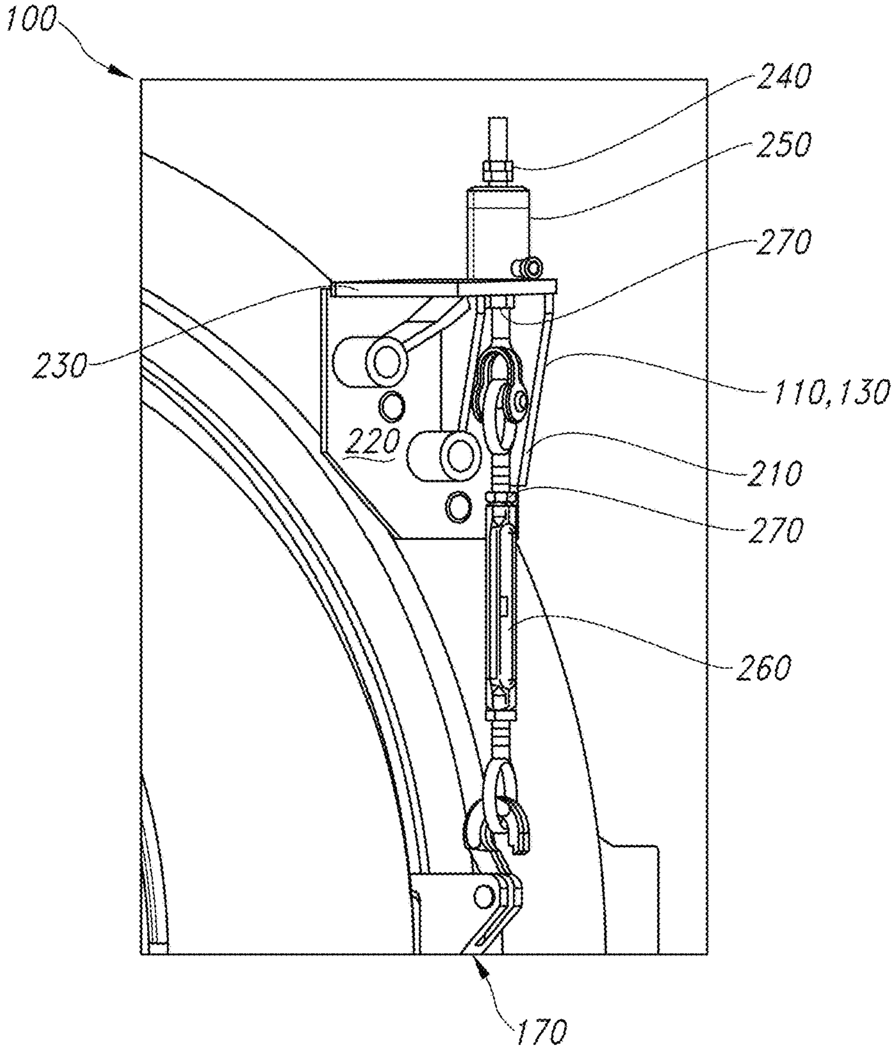
FIG. 5 is a perspective view of one of the forward inner compressor casing suspension devices of FIG. 4.
Figure 6:
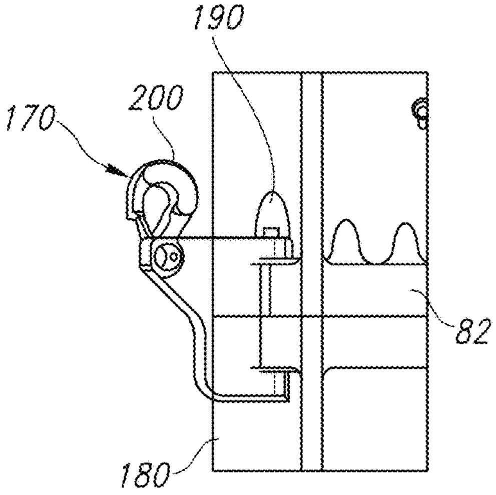
FIG. 6 is a side plan view of a C-clamp of the forward inner compressor casing suspension device of FIG. 4.
Figure 7:
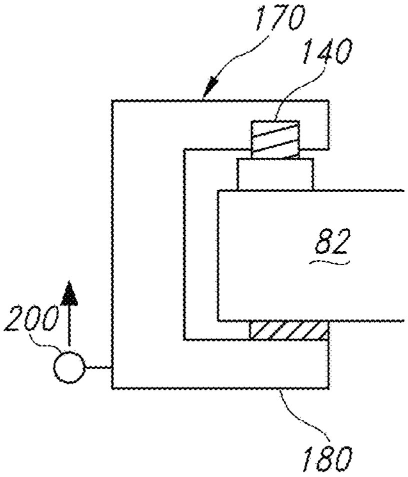
FIG. 7 is a schematic view of the C-clamp of the forward inner compressor casing suspension device of FIG. 4.

FIGS. 2 and 3 show the compressor 15 in greater detail. In this example, the compressor 15 may have a double wall compressor casing design 60. The double wall compressor casing 60 may have an inner compressor casing 65 and an inner diffuser casing 70 within an outer compressor casing 75. The inner compressor casing 65 and the inner diffuser casing 70 define an inner compressor casing-inner diffuser casing assembly 72. The outer compressor casing 75 may have an upper half 77 and a lower half 78. The inner compressor casing 65 also may have a number of segments 80. Each segment 80 may be joined by a pair of inner compressor casing flanges 82 secured by a bolt 84, other types of fasteners, and the like. (Only one of which is shown in FIG. 3 for clarity.)

As described above, the inner compressor casing 65 and the outer compressor casing 75 must be in full contact with a thrust face 85 of the inner diffuser casing 70 for the components to be in alignment. As is shown in FIG. 3, the inner compressor casing 65 has a pair of ears 90 along a horizontal plane. The ears 90 of the inner compressor casing 65 are positioned on a pair of wedges 95 on the outer compressor casing 75. The wedges 95 provide anti-rotation support during operation due to friction with the ears 90.

Figure 8:
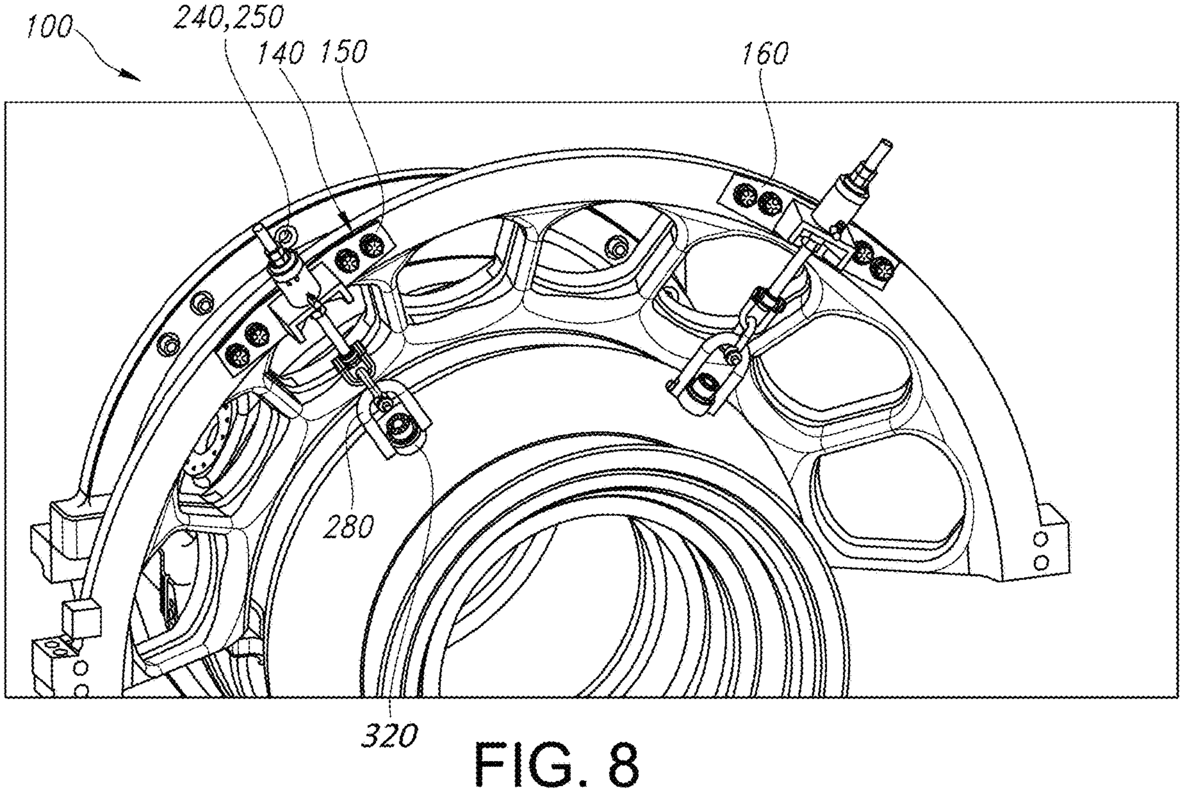
FIG. 8 is a front plan view of a pair of aft inner compressor casing suspension devices of the inner compressor casing suspension device.
Figure 9:
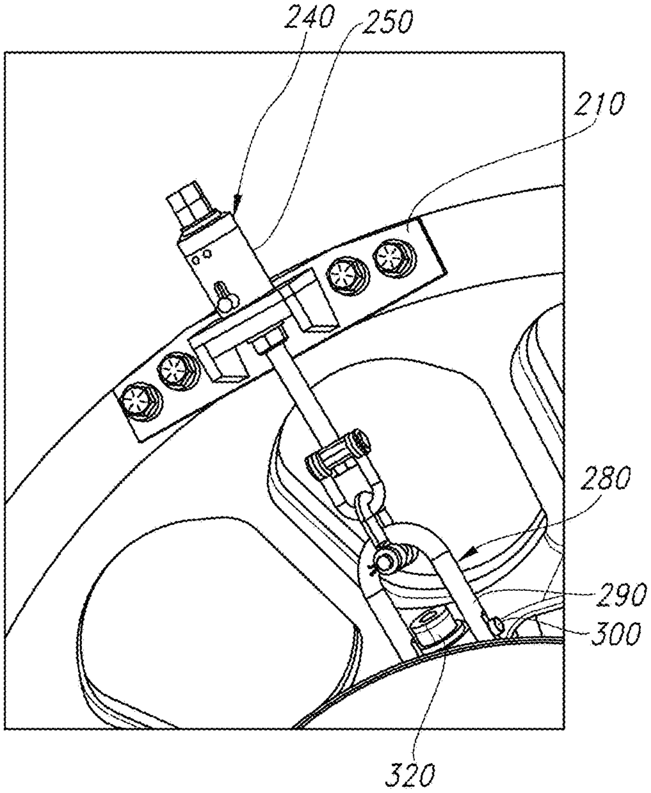
FIG. 9 is a perspective view of one of the aft inner compressor casing suspension devices of FIG. 8.

FIGS. 4-9 show an inner compressor casing suspension device 100 as may be described herein. FIGS. 4-7 show a pair of forward inner compressor casing suspension devices 110, a first forward inner compressor casing suspension device 120 and a second forward inner compressor casing device 130. FIGS. 8 and 9 show a pair of aft inner compressor casing suspension devices 140, a first aft inner compressor casing suspension device 150 and a second aft inner compressor casing device 160. The forward inner compressor casing suspension devices 110 and the aft inner compressor casing suspension devices 140 work together to lift the inner compressor casing 65 within the outer compressor casing 75. Although pairs of the forward inner compressor casing suspension devices 110 and the aft inner compressor casing suspension devices 140 are shown, one or more of the devices 110, 140 may be used herein.

Each inner compressor casing suspension device 110 of FIGS. 4-7 includes a "C-clamp" 170 attached to the inner compressor casing 65. The cast outer surface of the inner compressor casing 65 may have significant dimensional variations without a suitable flat surface for gripping or attachment. The C-clamp 170 may have a substantial "C" shaped frame 180 that may be positioned about a pair of the flanges 82 positioned horizontally about the inner compressor casing 65. A tapered pin 190 may extend through the frame 180 and the flanges 82. The use of the tapered pin 190 protects the internal components within the flanges 82. The C-clamp 170 thus may be tightened down over the flanges 82 in place of the bolt 84 or other type of fastener. The tapered pin 190 may have a bending moment that may be applied to carry the load of lifting the inner compressor casing 65. The C-clamp 170 also may have a hook 200 on the upper part of the frame 180 for lifting. Other components and other configurations may be used herein.

Each forward inner compressor casing suspension device 110 has an eyebrow bracket holder 210 attached to the outer compressor casing 75. The eyebrow bracket holder 210 may include a flat plate 220 and a bracket 230. The flat plate 220 of the eyebrow bracket holder 210 may be attached to the outer compressor casing 75 via existing bolt holes and conventional body bound bolts and the like. The bracket 230 may support a lift device 240 thereon. In this example, the lift device 240 may be a hydraulic cylinder 250. The hydraulic cylinder 250 may be of conventional design and may lift about ten to fifteen tons or more. Other capacities and other types of lift devices 240 may be used herein.

Each forward inner compressor casing suspension device 110 includes a turnbuckle 260 or other type of drive screw, stretching screw, and the like extending between the C-clamp 170 and the eyebrow bracket holder 210. The turnbuckle 260 may be of conventional design and may have a capacity of about 15,000 pounds or more. Any type of length adjusting device may be used herein. A number of lock nuts 270 may be used herein as a safety stop. One or more of the lock nuts 270 may be a washer, a shim, and the like set for a predetermined maximum distance. Other components and other configurations may be used herein.

Each aft inner compressor casing suspension device 140 of FIGS. 8 and 9 may include a swivel lift eye 280 attached to the inner diffuser casing 70. The swivel lift eye 280 may be of conventional design with a pair of arms 290 connected by a pin 300. Other types of connection devices may be used herein. The swivel lift eye 280 may be attached to an existing inner diffuser casing lift hole 310 via the pin 300 extending through a bolt 320.

As above, aft forward inner compressor casing suspension device 140 has the eyebrow bracket holder 210 attached to the outer compressor casing 75. The eyebrow bracket holder 210 may include the flat plate 220 and the bracket 230. The flat plate 220 of the eyebrow bracket holder 210 may be attached to the outer compressor casing 75 via existing bolt holes and conventional bolts and the like. Other types of fastening means may be used herein. The bracket 230 may support the lift device 240 thereon. In this example, the lift device 240 may be a hydraulic cylinder 250. The hydraulic cylinder 250 may be of conventional design and may lift about ten to fifteen tons or more. Other capacities and other types of lift devices 240 may be used herein.

Each aft inner compressor casing suspension device 140 includes the turnbuckle 260, or other type of drive screw, stretching screw, and the like extending between the swivel lift eye 280 and the eyebrow bracket holder 210. The turnbuckle 260 may be of conventional design and may have a capacity of about 15,000 pounds or more. Any type of length adjusting device may be used herein. A number of lock nuts 270 may be used herein as a safety stop. One or more of the lock nuts 270 may be a washer, a shim, and the like set for a predetermined maximum distance. Other components and other configurations may be used herein.

In use, the pair of forward inner compressor casing suspension devices 110 and the pair of aft inner compressor casing suspension devices 140 of the inner compressor casing suspension device 100 are attached to the inner compressor casing 65 and the inner diffuser casing 70 of the inner compressor casing-inner diffuser casing assembly 72 as described above. The inner compressor casing suspension device 100 thus lifts the inner compressor casing-inner diffuser casing assembly 72 by the predetermined distance. The inner compressor casing suspension device 100 allows the inner compressor casing-inner diffuser casing assembly 72 to be lifted with the outer compressor casing 75 in place in a highly controlled lift range of about 0.025 to about 0.050 inches or so (about 0.635 to about 1.27 millimeters). Specifically, the ears 90 of the inner compressor casing 65 are lifted off of the wedges 95 of the outer compressor casing 75. The inner compressor casing suspension device 100 measures and monitors the lift height while the alignment procedures are in progress. Once lifted, the inner compressor casing-inner diffuser casing assembly 72 may be maneuvered left and right as well as aft for full circumferential engagement with the thrust face 85. Any gaps in the thrust face 85 may be checked with feeler gauges and sight holes as well as laser alignment. The inner compressor casing-inner diffuser casing assembly 72 then may be lowered into position by the inner compressor casing suspension device 100.

Figure 10:
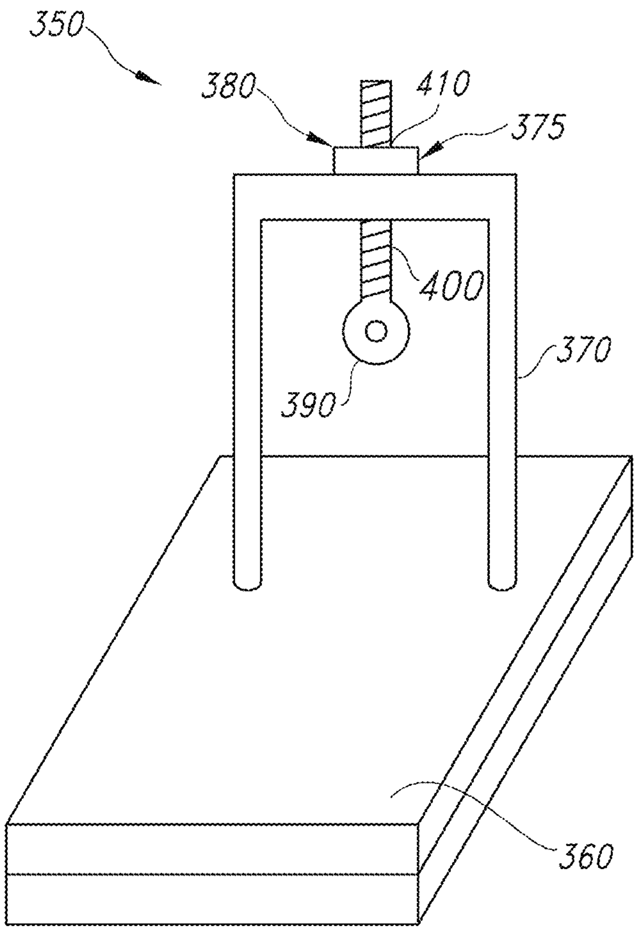
FIG. 10 is a perspective view of an alternative embodiment of an inner compressor casing suspension device having a swivel eye lift assembly.

FIG. 10 shows an alternative embodiment of an inner compressor casing suspension device 350 as may be described herein. This embodiment may be used when either or both of the outer compressor casings 75 have been removed. The inner compressor casing suspension device 350 may have an X-Y linear slide 360 so as to maneuver the inner compressor casing-inner diffuser casing assembly 72. The X-Y linear slide 360 may be of conventional design and may maneuver along the X-axis and the Y-axis via threaded rods, hydraulics, and the like. Alternatively, Teflon plates with screw adjustments and the like also may be used.

The inner compressor casing suspension device 350 may have a support frame 370 extending from the X-Y linear slide 360. The support frame 370 may be made from any solid load bearing material and may have any suitable size, shape, and configuration. The inner compressor casing suspension device 350 may have a lift mechanism 375 associated with the support frame 370. In this example, the lift mechanism 375 may be a swivel lift eye assembly 380 or other type of rotationally capable lift assembly and the like. The swivel lift eye assembly 380 may be positioned on the support frame 370. The swivel lift eye assembly 380 may include a swivel lift eye 390, a swivel lift hook, and the like attached to a threaded rod 400. The threaded rod 400 may extend through a threaded hole 410 within the support frame 370 or another fixture for rotation therewith. Multiple swivel lift eye assemblies 380 may be used herein. Other components and other configurations may be used herein.

The one or more swivel lift eye assemblies 380 of the inner compressor casing suspension device 350 may attach to the C-clamps 170 of the inner compressor casing-inner diffuser casing assembly 72 in a manner similar to that described above. The threaded rod 400 of the swivel lift eye assembly 380 then may be rotated to raise or lower the swivel lift eye 390 attached to the C-clamp 170 of the inner compressor casing-inner diffuser casing assembly 72. Other types of rotationally capable lift assemblies may be used herein.

Figure 11:
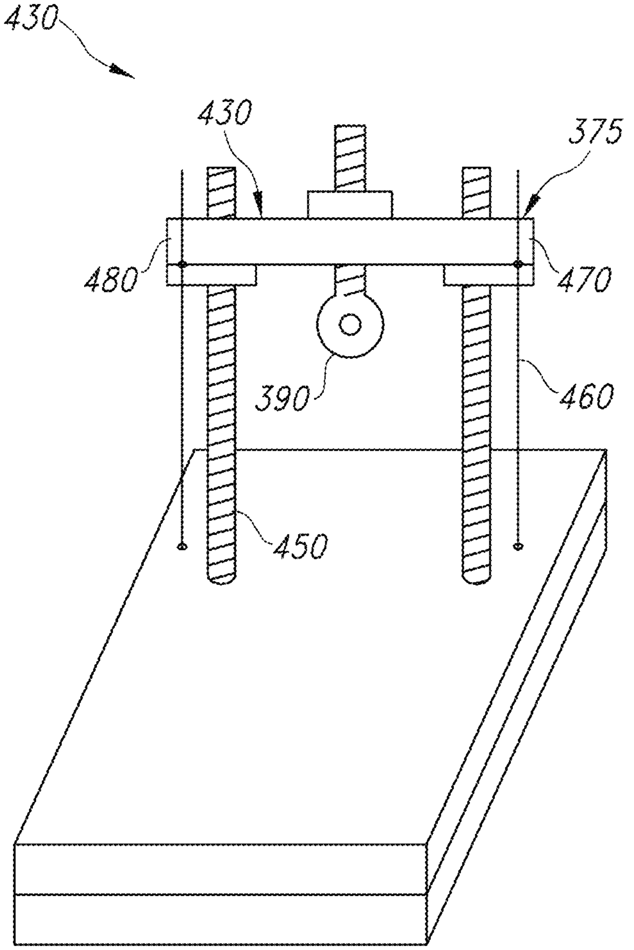
FIG. 11 is a perspective view of an alternative embodiment of an inner compressor casing suspension device having a lift plate assembly.

FIG. 11 shows a further alternative embodiment of an inner compressor casing suspension device 430. The inner compressor casing suspension device 430 may use the X-Y linear slide 360 as described above. Instead of using the support frame 370 and the swivel lift eye assembly 380, the inner compressor casing suspension device 430 may use a lift plate assembly 440 as the lift mechanism 375. The lift plate assembly 440 may have a number of jacking bolts 450 extending from the X-Y linear slide 360. Given the weight involved, a pair or more of the jacking bolts 450 may be used. One or more guide rods 460 also may be used. The jacking bolts 450 may be threaded while the guide rods 460 may be smooth. The lift plate assembly 440 also may include a lift plate 470 attached to the jacking bolts 450 and the guide rods 460. The lift plate 470 may have any suitable size, shape, or configuration. The lift plate 470 may have suitable threaded holes 480 to mate and maneuver with the jacking bolts 450. The lift plate 470 may have a swivel lift eye 390, a swivel lift hook, and the like attached thereto. Other components and other configurations may be used herein.

The swivel lift eye 390 of the lift plate assembly 440 may be attached to the C-clamp 170 of the inner compressor casing-inner diffuser casing assembly 72 as described above. The jacking bolts 450 of the lift plate assembly 440 then may be rotated to raise or lower the lift plate 470 and the swivel lift eye 390 attached to the C-clamp 170 of the inner compressor casing-inner diffuser casing assembly 72. Raising and lowering the lift plate 470 also may be performed by hydraulics, an air bag, and the like.

The inner compressor casing suspension devices described herein thus provide the means to align the inner compressor casing regardless of whether the outer casing is present or not. Removing the outer casing is time consuming and costly. The ability to perform the alignment with the outer casing in place would save days in labor and outage time.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. An inner compressor casing suspension device for lifting an inner compressor casing-inner diffuser casing assembly within an outer compressor casing, comprising: one or more forward inner compressor casing suspension devices; each of the one or more forward inner compressor casing suspension devices extending from the outer compressor casing to the inner compressor casing-inner diffuser casing assembly; each of the one or more forward inner compressor casing suspension devices comprising a C-clamp and a forward lifting device; and one or more aft inner compressor casing suspension devices; each of the one or more aft inner compressor casing suspension devices extending from the outer compressor casing to the inner compressor casing-inner diffuser casing assembly; each of the one or more aft inner compressor casing suspension devices comprising an aft lifting device.

2. The inner compressor casing suspension device of any preceding clause, wherein the C-clamp of each of the one or more forward inner compressor casing suspension devices comprises a substantial "C"-shaped frame.

3. The inner compressor casing suspension device of any preceding clause, wherein an inner compressor casing of the inner compressor casing-inner diffuser casing assembly comprises a flange and wherein the C-clamp comprises a pin that extends through the flange.

4. The inner compressor casing suspension device of any preceding clause, wherein the pin comprises a tapered pin.

5. The inner compressor casing suspension device of any preceding clause, wherein the C-clamp comprises a hook.

6. The inner compressor casing suspension device of any preceding clause, wherein each of the one or more forward inner compressor casing suspension devices comprises an eyebrow bracket holder attached to the outer compressor casing.

7. The inner compressor casing suspension device of any preceding clause, wherein the eyebrow bracket holder comprises a flat plate and a bracket.

8. The inner compressor casing suspension device of any preceding clause, wherein the forward lifting device comprises a hydraulic cylinder.

9. The inner compressor casing suspension device of any preceding clause, wherein each of the one or more forward inner compressor casing suspension devices comprises a turnbuckle extending between the C-clamp and the forward lifting device.

10. The inner compressor casing suspension device of any preceding clause, wherein the turnbuckle comprises one or more lock nuts.

11. The inner compressor casing suspension device of any preceding clause, wherein the inner compressor casing-inner diffuser casing assembly comprises an inner diffuser casing and wherein each of the one or more aft inner compressor casing suspension devices comprises a swivel lift eye attached to the inner diffuser casing.

12. The inner compressor casing suspension device of any preceding clause, wherein the swivel lift eye comprises a pair of arms connected by a pin.

13. The inner compressor casing suspension device of any preceding clause, wherein each of the one or more aft inner compressor casing suspension devices comprises a turnbuckle extending between the swivel lift eye and the aft lifting device.

14. The inner compressor casing suspension device of any preceding clause, wherein the aft lifting device comprises a hydraulic cylinder.

15. A method of lifting an inner compressor casing-inner diffuser casing assembly within an outer compressor casing, comprising: attaching one or more forward inner compressor casing suspension devices from the outer compressor casing to a flange of an inner compressor casing of the inner compressor casing-inner diffuser casing assembly via a C-clamp; attaching one or more aft inner compressor casing suspension devices from the outer compressor casing to an inner diffuser casing of the inner compressor casing-inner diffuser casing assembly; and lifting the inner compressor casing-inner diffuser casing assembly via the one or more forward inner compressor casing suspension devices and the one or more aft inner compressor casing suspension devices.

We claim:

1. An inner compressor casing suspension device for lifting an inner compressor casing-inner diffuser casing assembly within an outer compressor casing, comprising:

one or more forward inner compressor casing suspension devices;

each of the one or more forward inner compressor casing suspension devices extending from the outer compressor casing to the inner compressor casing-inner diffuser casing assembly;

each of the one or more forward inner compressor casing suspension devices comprising a C-clamp and a forward lifting device; and one or more aft inner compressor casing suspension devices;

each of the one or more aft inner compressor casing suspension devices extending from the outer compressor casing to the inner compressor casing-inner diffuser casing assembly;

each of the one or more aft inner compressor casing suspension devices comprising an aft lifting device;

wherein the C-clamp of the one or more forward inner compressor casing suspension devices comprises a substantially "C"-shaped frame.

2. The inner compressor casing suspension device of claim 1, wherein an inner compressor casing of the inner compressor casing-inner diffuser casing assembly comprises a flange and wherein the C-clamp comprises a pin that extends through the flange.

3. The inner compressor casing suspension device of claim 2, wherein the pin comprises a tapered pin.

4. The inner compressor casing suspension device of claim 1, wherein the C-clamp comprises a hook.

5. The inner compressor casing suspension device of claim 1, wherein each of the one or more forward inner compressor casing suspension devices comprises an eyebrow bracket holder attached to the outer compressor casing.

6. The inner compressor casing suspension device of claim 5, wherein the eyebrow bracket holder comprises a flat plate and a bracket.

7. The inner compressor casing suspension device of claim 1, wherein the forward lifting device comprises a hydraulic cylinder.

8. The inner compressor casing suspension device of claim 1, wherein each of the one or more forward inner compressor casing suspension devices comprises a turnbuckle extending between the C-clamp and the forward lifting device.

9. The inner compressor casing suspension device of claim 8, wherein the turnbuckle comprises one or more lock nuts.

10. The inner compressor casing suspension device of claim 1, wherein the inner compressor casing-inner diffuser casing assembly comprises an inner diffuser casing and wherein each of the one or more aft inner compressor casing suspension devices comprises a swivel lift eye attached to the inner diffuser casing.

11. The inner compressor casing suspension device of claim 10, wherein the swivel lift eye comprises a pair of arms connected by a pin.

12. The inner compressor casing suspension device of claim 11, wherein each of the one or more aft inner compressor casing suspension devices comprises a turnbuckle extending between the swivel lift eye and the aft lifting device.

13. The inner compressor casing suspension device of claim 1, wherein the aft lifting device comprises a hydraulic cylinder.

14. A method of lifting an inner compressor casing-inner diffuser casing assembly within an outer compressor casing, comprising:

attaching one or more forward inner compressor casing suspension devices from the outer compressor casing to a flange of an inner compressor casing of the inner compressor casing-inner diffuser casing assembly via a C-clamp;

attaching one or more aft inner compressor casing suspension devices from the outer compressor casing to an inner diffuser casing of the inner compressor casing-inner diffuser casing assembly; and lifting the inner compressor casing-inner diffuser casing assembly via the one or more forward inner compressor casing suspension devices and the one or more aft inner compressor casing suspension devices.

* * * * *